United States Patent
Ha et al.

(10) Patent No.: US 7,758,990 B2
(45) Date of Patent: Jul. 20, 2010

(54) FLUID RECYCLING APPARATUS AND FUEL CELL SYSTEM USING THE SAME

(75) Inventors: Myeong-Ju Ha, Suwon-si (KR); In-Seob Song, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 12/170,259

(22) Filed: Jul. 9, 2008

(65) Prior Publication Data

US 2009/0110980 A1    Apr. 30, 2009

(30) Foreign Application Priority Data

Oct. 30, 2007    (KR)    ............... 10-2007-0109803

(51) Int. Cl.
  H01M 2/02    (2006.01)
  H01M 8/00    (2006.01)
  H01M 8/18    (2006.01)
  C25B 7/00    (2006.01)

(52) U.S. Cl. .............. 429/34; 429/21; 429/12; 204/242; 204/600

(58) Field of Classification Search ............ 429/21, 429/30, 34, 22, 13, 12, 40, 33; 204/252, 204/98; 137/487.5; 96/4.15, 44
See application file for complete search history.

(56) References Cited

U.S. PATENT DOCUMENTS 4,288,310 A * 9/1981 Knight et al. ............. 204/252

2003/0138677 A1    7/2003 Preidel
2006/0029851 A1 *  2/2006 Santiago et al. ............ 429/30
2006/0040143 A1 *  2/2006 Aoki et al. ................. 429/12
2007/0172720 A1    7/2007 Mogi et al.

FOREIGN PATENT DOCUMENTS

| EP | 1 284 517 A1 | 2/2003 |
| JP | 2006-185629 | 7/2006 |
| KR | 10-2005-0025499 | 3/2005 |
| KR | 10-2006-0035549 | 4/2006 |

(Continued)

OTHER PUBLICATIONS

European Search Report dated Jan. 14, 2009 for corresponding Application No. EP 08 16 3985, noting the references listed in this IDS.

(Continued)

*Primary Examiner*—Jonathan Crepeau
*Assistant Examiner*—Kenneth Douyette
(74) *Attorney, Agent, or Firm*—Christie, Parker & Hale, LLP

(57) ABSTRACT

Fuel recycling apparatuses and fuel cell systems using the same are provided. The fluid recycling apparatus includes a porous member having first and second ends, a first electrode coupled to the first end of the porous member, a second electrode coupled to the second end of the porous member, and a power supplier for applying a constant voltage between the first electrode and the second electrode. The porous member moves a liquid from the first end of the porous member to the second end of porous member and discharges a gas under the voltage applied by the power supplier.

23 Claims, 3 Drawing Sheets

FOREIGN PATENT DOCUMENTS

KR   10-2007-0021227   2/2007

OTHER PUBLICATIONS

Patent Abstracts of Japan, Publication No. 2006-185629; Date of Publication: Jul. 13, 2006; in the name of Akinao Hashimoto et al.

Korean Patent Abstracts, Publication No. 1020050025499 A; Date of Publication: Mar. 14, 2005; in the name of Tae Hee Cho et al.

Korean Patent Abstracts, Publication No. 1020060035549 A; Date of Publication: Aug. 26, 2006; in the name of Yasukazu Iwasaki et al.

Korean Patent Abstracts, Publication No. 1020070021227 A; Date of Publication: Feb. 22, 2007; in the name of Joachim Koehler et al.

* cited by examiner

FLUID RECYCLING APPARATUS AND FUEL CELL SYSTEM USING THE SAME

CROSS-REFERENCE TO RELATED APPLICATIONS

This application claims priority to and the benefit of Korean Patent Application No. 10-2007-0109803 filed on Oct. 30, 2007 in the Korean Intellectual Property Office, the entire content of which is incorporated herein by reference.

BACKGROUND

1. Field of the Invention

The present invention relates to fuel recycling apparatuses and fuel cell systems using the same.

2. Discussion of Related Art

Fuel cells are pollution-free power supply apparatuses, and have therefore been spotlighted as next generation clean energy power generation systems. Power generation systems using fuel cells can be used in self-generators for large buildings, power supplies for electric vehicles, portable power supplies, etc., and can use various fuels, such as natural gas, city gas, naphtha, methanol, waste gas, etc. Fuel cells generally operate on the same basic principle and are classified into molten carbonate fuel cells (MCFCs), solid oxide fuel cells (SOFCs), polymer electrolyte membrane fuel cells (PEMFCs), phosphoric acid fuel cells (PAFCs), alkaline fuel cells (AFCs), etc., according to the electrolyte used.

The polymer electrolyte membrane fuel cells are further classified into polymer electrolyte membrane fuel cell (PEMFCs) or proton exchange membrane fuel cells and direct methanol fuel cells (DMFCs), according to the fuel used.

The polymer electrolyte membrane fuel cell uses a solid polymer as the electrolyte, and therefore, has no risk of corrosion or evaporation due to the electrolyte, and can obtain high current density per unit area. Moreover, since the polymer electrolyte membrane fuel cell has very high output characteristics and low operating temperatures compared to other kinds of fuel cells, it can be used in various applications. For example, the PEMFC has been actively developed as a portable power supply for supplying power to vehicles, etc., a distributed power supply for supplying power to houses or public buildings, etc., and a small power supply for supplying power to electronic equipment, etc.

The direct methanol type fuel cell uses liquid fuel, such as methanol, etc. without a fuel reformer and operates at a temperature less than 100° C. Therefore, the DMFC is suitable for use as a portable power supply or a small power supply.

The polymer electrolyte membrane fuel cell generally includes an anode, an ion selective membrane, and a cathode. The anode and cathode include a catalyst layer, a gas diffusion layer, and a current collection layer. The ion selective membrane permits the transfer of protons, but has high resistivity for electron conduction and anion transfer.

In the polymer electrolyte membrane fuel cell as described above, if fuel, such as pure hydrogen or a methanol aqueous solution, is supplied to the anode, and oxidant, such as air, is supplied, the fuel generates protons and electrons by an oxidation reaction in the catalyst layer of the anode. At that time, the protons move to the cathode through the ion selective membrane, and the electrons move to the cathode through the external circuit. The protons and electrons move to the catalyst of the cathode, where water and heat energy are generated by means of a reduction reaction. Electric energy is then generated by the flow of electrons through the external circuit.

The polymer electrolyte membrane fuel cell as described above uses a solid polymer electrolyte membrane as the ion selective membrane. Therefore, to transfer the protons from the anode to the cathode through the electrolyte membrane, it is the electrolyte membrane must be properly humidified. On the other hand, during operation of the system, the water in the polymer electrolyte membrane fuel cell moves from the anode to the cathode through the membrane, together with the protons. The water is discharged to the outside of the fuel cell by evaporation, condensation, diffusion, etc. Therefore, the polymer electrolyte membrane fuel cell system supplies humidified reactant (fuel and/or oxidant) to the anode and/or cathode to prevent drying out the membrane.

In a general polymer electrolyte membrane fuel cell system, it is very important to manage water. Therefore, the system includes a recycling device, which recycles and reuses the water or the fuel within the fuel cell system, to improve water management and system efficiency within the fuel cell system. However, the recycling device recycles and stores the water and/or the non-reaction fuel and should then supply it to the anode of the fuel cell. Therefore, if the recycling device mounted to the fuel cell system is not able to operate during shaking and rotation, it is difficult to apply it to small or portable fuel cell systems.

SUMMARY OF THE INVENTION

According to an embodiment of the present invention, a fluid recycling apparatus is oriented to operate during shaking or rotation while selectively recycling only liquid of the gases and liquids injected externally and electroosmotically moving the recycled liquids.

In another embodiment of the present invention, a fuel cell system is oriented to operate during shaking or rotation by using a fluid recycling apparatus.

In one embodiment of the present invention, a fluid recycling apparatus includes a bar-shaped porous member having a length and first and second ends, a first electrode coupled to the first end of the porous member, a second electrode coupled to the second end of the porous member, and a power supplier for applying a constant voltage between the first electrode and the second electrode. The liquid moves from the first end of the porous member to the second end of porous member under the electric field applied between the first and second electrodes, and the gas is discharged through the porous member.

According to another embodiment of the present invention, a fluid recycling apparatus includes a bar-shaped porous member having a length and first and second ends, a first electrode coupled to the first end of the porous member, a second electrode coupled to the second end of the porous member, a power supplier for applying a constant voltage between the first and second electrodes, and a gas-liquid separator between the first and second ends of the porous member. When gases and liquids are injected near the first end of the porous member, the liquid is discharged through the second end of the porous member, and the gas is discharged through a gas-liquid separator of the porous member.

In one exemplary embodiment, the bar shape of the porous member may be a straight shape or a flexed shape, for example a shape with one or more bends.

The porous member may include a material selected from polymers, silica, silicon, quartz, ceramics, and mixtures thereof.

The fluid recycling apparatus may include a heat exchanger coupled to the first and second ends of the porous member, for taking heat energy away from the gas and liquid or the liquid.

The fluid recycling apparatus may include a mixing tank integrally coupled to the second end of the porous member for storing water from the second end of porous member.

In another embodiment of the present invention, a fuel cell system includes a main body including an anode, a cathode, and an electrolyte between the anode and the cathode. The fuel cell system further includes a fluid recycling apparatus for selectively recycling only the desired fluids from the fuel cell main body. The fluid recycling apparatus includes a bar-shaped porous member having a length and first and second ends, a first electrode coupled to the first end of the porous member, a second electrode coupled to second end of the porous member, and a power supplier for applying a constant voltage between the first and second electrodes. When the gases and liquids are injected near the first end of the porous member, the liquid moves from near the first end to near the second end under the electric field applied between the first and second electrodes, and the gas is discharged through the middle of the porous member.

In one exemplary embodiment, the fuel cell system further includes a first pipe coupled to a fluid outlet of the cathode and anode and the first end of the porous member, a second pipe coupled to the second end of the porous member. The porous member includes a first groove into which the first pipe is inserted in the first end of the porous member, and a second groove into which the second pipe is inserted in the second end of the porous member.

The fuel cell system may further include a first fixation device for fixing the first pipe to the first end of the porous member. Further, the fuel cell system may further include a second fixation device for fixing the second pipe to the second end of the porous member.

The fuel cell system may further include a gas-liquid separator between the first and second ends of the porous member. The gas-liquid separator may surround the porous member. In this case, the gas is discharged through the gas-liquid separator.

The fuel cell system may further include a heat exchanger coupled to the first end and/or the second end of the porous member for cooling the gases and liquids or the liquids.

The fuel cell system may further include a mixing tank for storing the liquid from the fluid recycling apparatus. One end of the fluid recycling apparatus is integrally coupled to the mixing tank.

BRIEF DESCRIPTION OF THE DRAWINGS

These and/or other features and advantages of the present invention will become apparent by reference to the following detailed description when considered in conjunction with the accompanying drawings, in which.

DETAILED DESCRIPTION OF EXEMPLARY EMBODIMENTS

Figure 1:
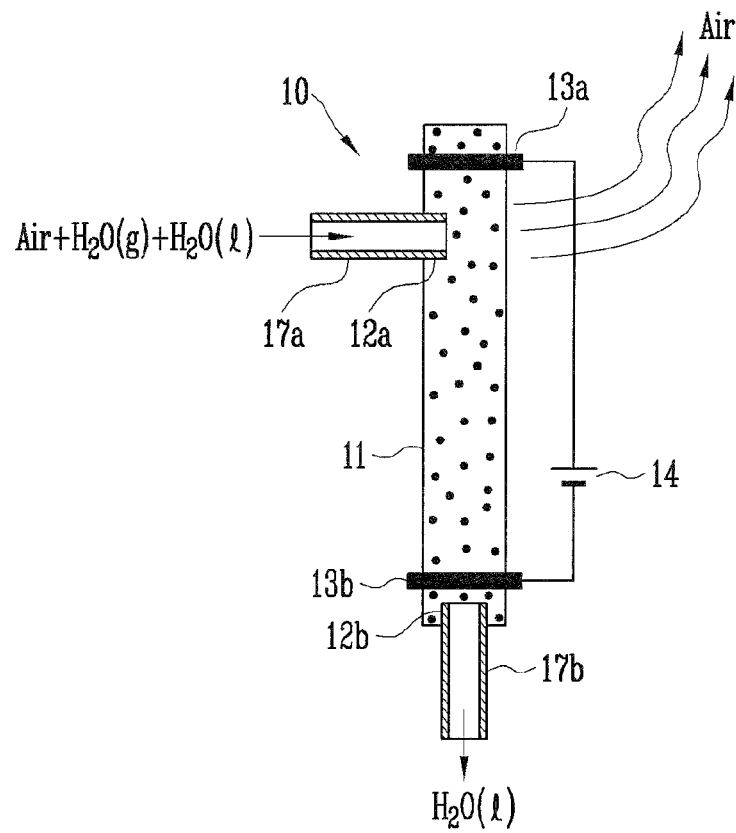
FIG. 1 is a schematic view of a fluid recycling apparatus according to an embodiment of the present invention.

Hereinafter, certain exemplary embodiments of the present invention will be described with reference to the accompanying drawings. Elements that are not essential to the complete understanding of the invention are omitted for clarity. Also, like reference numerals refer to like elements throughout.

Figure 2:
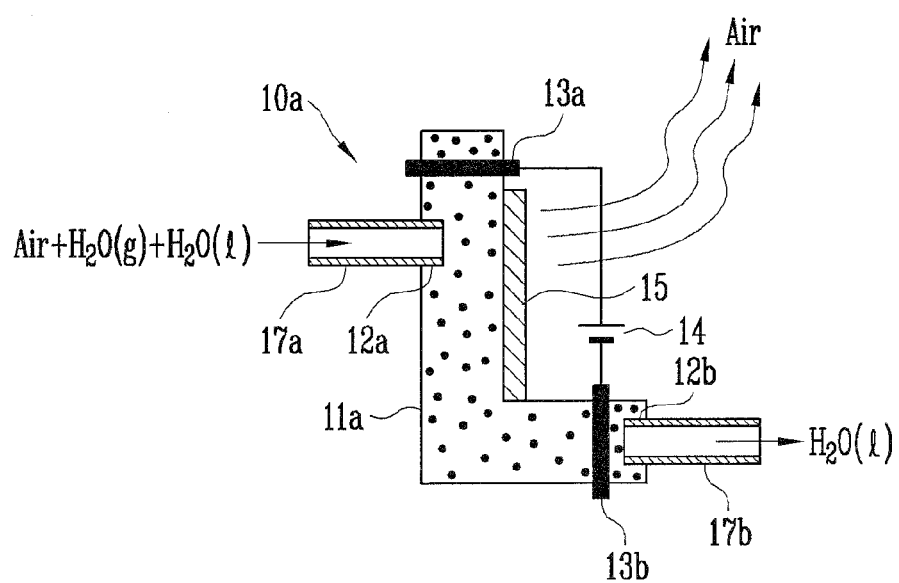
FIG. 2 is a schematic view of a fluid recycling apparatus according to another embodiment of the present invention.
Figure 3:
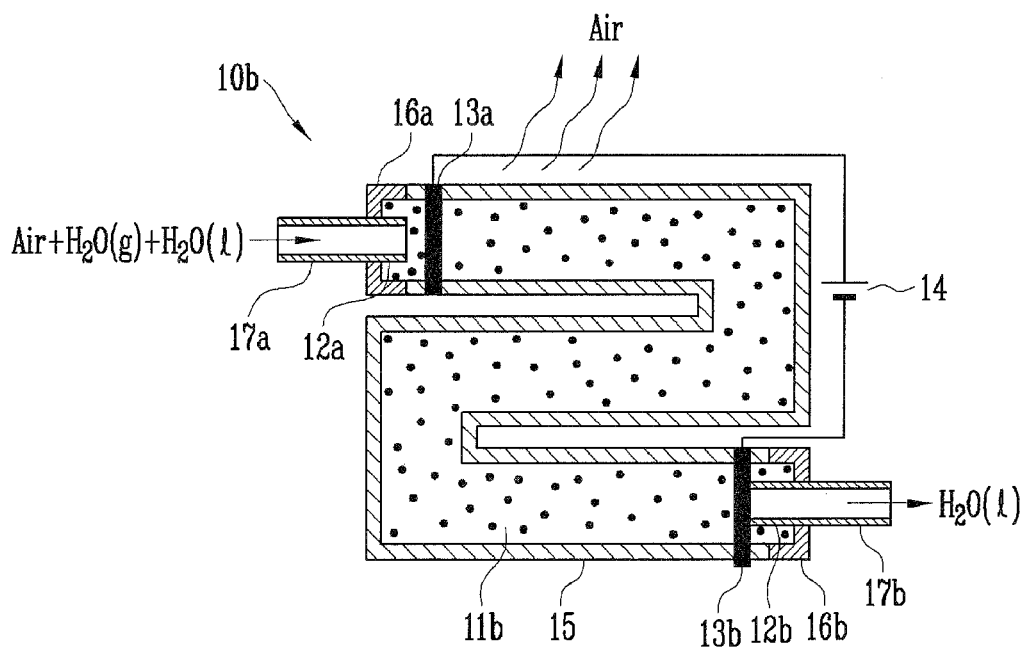
FIG. 3 is a schematic view of a fluid recycling apparatus according to yet another embodiment of the present invention.

As used herein, a "fluid recycling apparatus" is an apparatus for recycling a desired liquid within a fuel cell system. Herein, the liquid contains water. However, the liquid is not limited to water, and may contain liquid fuels, etc. Some components, e.g. 16a, 16b, 17a, 17b, of accompanying FIGS. 1 to 3 are shown in cross-section to enable easy and clear explanation of the present invention. Also, the "fluid recycling apparatus" is described mainly as an apparatus for recycling and reusing the desired liquid, but the present invention is not limited thereto and the fluid recycling apparatus may recycle an undesired liquid (polluted water) in order to discard it.

FIG. 1 is a schematic view of a fluid recycling apparatus according to an embodiment of the present invention. Referring to FIG. 1, the fluid recycling apparatus 10 includes a bar-shaped porous member 11 having a constant length and first and second ends, a first electrode 13a coupled to the first end of the porous member 11, a second electrode 13b coupled to the second end of the porous member 11, and a power supplier 14 for applying a constant voltage between the first electrode 13a and the second electrode 13b.

As shown in FIG. 1, the porous member 11 is a straight, bar shape having a length of several millimeters (mm) to several tens of centimeters (cm). The cross section of the porous member 11 may be circular, ovular, polygonal, or a combination thereof. Also, the first end of the porous member 11 has a first groove 12a, and the second end of the porous member 11 has a second groove 12b. One end of a first pipe 17a for injecting gas and liquid is inserted into the first groove 12a, and one end of a second pipe 17b for discharging the liquid is inserted into the second groove 12b.

The porous member 11 may include a material selected from polymers, silica, silicon, quartz, ceramics, and mixtures thereof. The aperture of the porous member 11 has a size for permitting movement of liquids containing water, etc. For example, the size of the aperture may range from approximately several to several hundreds of micrometers (μm).

The first end of the porous member 11 includes any surface extending from the first end of the porous member, and is not limited to the surface perpendicular to the longitudinal axis of the porous member. Similarly, the second end of the porous member 11 includes any surface extending from the second end of the porous member, and is not limited to the surface perpendicular to the longitudinal axis of the porous member. In one embodiment, for example, the first end of the porous member 11 is a surface adjacent the surface perpendicular to the longitudinal axis of the porous member, and the second end is the surface at the second end of the porous member that is perpendicular to the longitudinal axis of the porous member, as shown in FIG. 1. The middle portion, between the first and second ends of the porous member 11 may be any surface between the first and second ends except for the surfaces of the first and second ends. In one embodiment, for example, the middle portion may be a surface facing the first groove 12a in the first end, as shown in FIG. 1.

The first electrode 13a is fixedly mounted to the first end of the porous member 11, and the second electrode 13b is fixedly mounted to the second end of the porous member 11. The first electrode 13a is coupled to a positive side of the power supplier 14, and the second electrode 13b is coupled to a negative side of the power supplier 14.

The power supplier 14 is an apparatus for applying a constant voltage to the first electrode 13a and the second electrode 13b, and may include a battery, a capacitor, a fuel cell, a commercial power supply, etc. Herein, the constant voltage indicates a voltage capable of electroosmotically moving the liquid contacting the porous member 11. The voltage may optionally be set according to an interval between the first and second electrodes 13a and 13b, and is approximately several volts to several tens of volts. For example, when the interval between the first and second electrodes 13a and 13b is approximately 1 centimeter (cm), approximately 1V to 2V may be applied.

The fluid recycling apparatus 10 according to an embodiment of the present invention operates as follows. When the gas and liquid are injected inside the porous member 11 through the first pipe 17a, the liquid electroosmotically moves from the first end to the second end under an electric field applied between the first electrode 13a and the second electrode 13b and is then discharged through the second pipe 17b. The gas is discharged through the middle portion between the first end and the second end. At this time, moisture in the gas injected inside the porous member 11 is cooled and condensed while passing through the inside of the porous member. The gas contains air or steam ($H_2O(g)$), and the liquid contains water ($H_2O(l)$) in the liquid phase.

FIG. 2 is a schematic view of a fluid recycling apparatus according to another embodiment of the present invention. Referring to FIG. 2, a fluid recycling apparatus 10a includes a porous member 11a having a generally 'L' shape, with one bend. The fluid recycling apparatus further includes a first electrode 13a coupled to the first end of the porous member 11a, and a second electrode 13b coupled to the second end of the end of the porous member 11a. In addition, the fluid recycling apparatus includes a power supplier 14 for applying a constant voltage between the first electrode 13a and the second electrode 13b, and a gas-liquid separator 15 coupled to a middle portion of the porous member 11a between the first end and the second end of the porous member.

The fluid recycling apparatus 10a is substantially the same as the fluid recycling apparatus 10 except that the porous member 11a has a 'L' shape with one bend, and the middle portion of the porous member 11a carries a gas-liquid separator 15. In this embodiment, when the first end and the second end of the porous member 11 are infinitely extended, they are two surfaces horizontal to each other so that the flow of liquid is progressed in approximately the same direction.

The gas-liquid separator 15 is made of a porous material. The gas-liquid separator 15 may be formed of the same material as the porous member 11a and may be a gas-liquid separator attached to the porous member 11a, or a coating layer formed on a surface of the porous member 11a.

When the gas and liquid are injected by constant pressure and pass through the porous member 11, the gas-liquid separator can effectively prevent the desired liquid from being discharged in the air. Therefore, the gas-liquid separator can improve the recycling rate of the desired liquid.

FIG. 3 is a schematic view of a fluid recycling apparatus according to yet another embodiment of the present invention. Referring to FIG. 3, a fluid recycling apparatus 10b according to yet another embodiment includes a porous member 11b having a serpentine shape and first and second ends, a first electrode 13a coupled to the first end of the porous member 11b, a second electrode 13b coupled to the second end of the porous member 11b, a power supplier 14 for applying constant voltage between the first electrode 13a and the second electrode 13b, a gas-liquid separator 15 surrounding the porous member 11b, a first fixing device 16a for fixedly coupling a first pipe 17a to the first end of the porous member 11b, and a second fixing device 16b for fixedly coupling a second pipe 17b to the second end of porous member.

The porous member 11b may be successively formed in the serpentine shape. The porous member 11b having the serpentine shape includes a first groove 12a positioned at the first end of porous member 11b, and one end of the first pipe 17a is inserted in the first groove 12a. The porous member 11b also includes a second groove 12b positioned at the second end of the porous member 11b, and one end of the second pipe 17b is inserted in the second groove.

The first fixing device 16a fixedly couples the first pipe 17a to the first groove 12a of the porous member 11b, and the second fixing device 16b fixedly couples the second pipe 17b to the second groove 12b of the porous member 11b. The first and second fixing devices 16 and 16b may be adhesives or connectors and may be polymeric materials, such as silicon, rubber, plastic, or the like.

The gas-liquid separator 15 surrounds the surface of the porous member 11b except for the first and second ends of the porous member 11b. When the gas and liquid are injected near the first end of the porous member 11b and the liquid then electroosmotically moves toward the second end of the porous member 11b, the gas can be slowly discharged through the surface of the porous member 11b.

Therefore, when operation of the apparatus stops, the liquid residing in the porous member 11b can be prevented from leaking outside.

Each of the fluid recycling apparatuses described above artificially sets the flow of liquid in a different manner. Therefore, the fluid recycling apparatuses discharge the undesired gases and electroosmotically move the desired liquids to recycle only the desired fluids. Further, moisture in the gas contacts the porous member and is cooled and condensed due to the porous member having a relatively lower temperature than that of the moisture. Therefore, the recycling rate of the moisture can be improved. Further, the fluid recycling apparatuses can transfer the fluids without having a separate transfer means such as a fuel pump. Also, since the apparatuses are not substantially affected by shaking or rotation, they can be widely applied. In particular, the fluid recycling apparatuses of the present invention are suitable for selectively recycling water generated from the cathode of a fuel cell.

Figure 4:
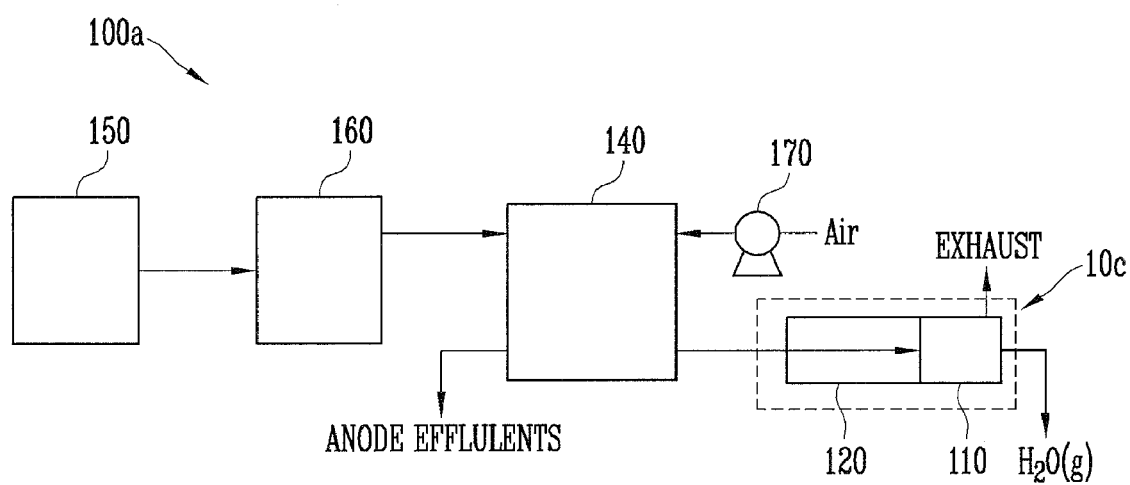
FIG. 4 is a schematic view of a polymer electrolyte membrane fuel cell system using a fluid recycling apparatus according to still another embodiment of the present invention.

FIG. 4 is a schematic view of a polymer electrolyte membrane fuel cell system using a fluid recycling apparatus according to another embodiment of the present invention. Referring to FIG. 4, the polymer electrolyte membrane fuel cell system 100a includes a fluid recycling apparatus 10c, a fuel cell main body 140, a fuel supplying apparatus 150, a reformer 160, and an oxidant supplying apparatus 170.

The fluid recycling apparatus includes a water recycler 110 and a heat exchanger 120. The water recycler 110 may include any one of the fluid recycling apparatuses described above with reference to FIGS. 1 to 3. The fluid recycling apparatus 10c includes the water recycler 110 coupled to the heat exchanger 120. The water recycled from the fluid recycling apparatus 10c is supplied to the reformer 160 and may be supplied to the fuel cell main body 140 together with fuel and/or oxidant.

The water recycler 110 substantially corresponds to the fluid recycling apparatuses described above, but can be combined with a heat exchanger 120, etc. For clarity of explanation in the specification, the fluid recycling apparatus, when used in a fuel cell system, is called a water recycler. The water recycler 110 selectively recycles the liquid of the gas and liquid generated from the cathode of the fuel cell main body 140. The gas can also be recycled through the water recycler 110. However, since the recycling rate of gas is insignificant, it is assumed that no recycling of gas occurs.

The heat exchanger 120 is coupled to the front end of the water recycler 110. If the heat exchanger 120 is coupled to the front end of the water recycler 110, the high-temperature fluid generated from the cathode of the fuel cell main body 140 is cooled to some degree and is then injected into the water recycler 110. Therefore, improvements in the steam recycling rate in the water recycler 110 can be promoted. Herein, the temperature of the fluid is associated with the operating temperature of the fuel cell main body 140, and is approximately 80° C. in general polymer electrolyte membrane fuel cells. The heat exchanger 120 can be an air-cooling type heat exchanger and/or a water-cooling type heat exchanger.

When the operating temperature of the fuel cell main body 140 is relatively low, i.e., about 50 to 60° C., the heat exchanger 120 may be coupled to the rear end of the water recycler 110. In this case, the water recycler 110 may include, for example, a gas-liquid separator (such as that described above with respect to the fluid recycling apparatus) in order to increase the recycling rate of moisture in the gas.

The fuel supplying apparatus 150 stores hydrogen-containing fuel and supplies the stored hydrogen-containing fuel to the reformer 160. Nonlimiting examples of suitable hydrogen-containing fuels include hydro-carbonaceous fuels such as methanol (MeOH), ethanol, butane gas, etc., sodium borohydride ($NaBH_4$), pure hydrogen ($H_2$), etc. The fuel supplying apparatus 150 can be a fuel tank storing the hydrogen-containing fuel and a transfer means, such as a fuel pump, between the fuel tank and the reformer 160. Also, the fuel supplying apparatus 150 can be a pressure tank storing butane, etc.

The reformer 160 reforms the hydrogen-containing fuel to generate hydrogen rich reformed gas and supplies the generated reformed gas to the anode of the fuel cell main body 140. The reformer 160 can be a heat source that generates heat by combusting the hydrogen-containing fuel (or other fuels) and a reforming reactor that reforms the hydrogen-containing fuel to steam using the heat generated from the heat source. In this case, the water necessary for the reforming reactor can be water recycled from the water recycler 110. When using pure hydrogen as the hydrogen-containing fuel in the fuel cell system, the reformer 160 can be omitted.

The oxidant supplying apparatus 170 supplies air in the atmosphere to the fuel cell main body 140. The oxidant supplying apparatus 170 can be an air pump, a blower, etc.

The fuel cell main body 140 generates electric energy by electrochemically reacting oxygen contained in air and hydrogen in the reformed gas, and discharges anode effluents (such as non-reaction reformed gas as by-products) and cathode effluents (such as water, etc.). The fuel cell main body 140 may include an anode, a cathode, and an electrolyte positioned between the anode and cathode. The anode and the cathode may each include a catalyst layer, a gas diffusion layer, and a separator. In one exemplary embodiment, the fuel cell main body may be a polymer electrolyte membrane fuel cell using a solid polymer, but the present invention is not limited thereto.

In a fuel cell system according to one embodiment, when the cathode separator includes a channel having a serpentine shape, a difference in internal pressure between a cathode fluid inlet and a cathode fluid outlet is generated. Also, a flooding phenomenon occurs near the cathode fluid outlet due to the relatively low internal pressure of the cathode fluid outlet. However, the fluid recycling apparatus coupled to the cathode fluid outlet discharges water from the cathode by a pressure, thereby preventing the flooding phenomenon.

Figure 5:
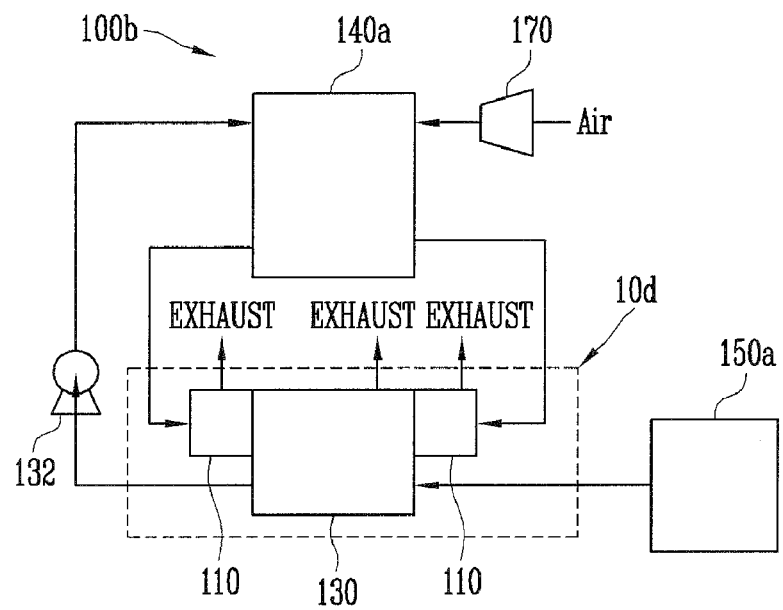
FIG. 5 is a direct methanol fuel cell using a fluid recycling apparatus according to still yet another embodiment of the present invention.

FIG. 5 is a direct methanol fuel cell using a fluid recycling apparatus according to yet another embodiment of the present invention. Referring to FIG. 5, a direct methanol fuel cell system 100b includes a fluid recycling apparatus 10d, a mixing tank 130, a fuel cell main body 140a, a fuel cell supplying apparatus 150a, and an oxidant supplying apparatus 170.

The fluid recycling apparatus 10d includes a water recycler 110 and a heat exchanger 120. The water recycler 110 may include any one of the fluid recycling apparatuses described above with reference to FIGS. 1 to 3. The fluid recycling apparatus 10d includes the water recycler 110 coupled to the mixing tank 130. In the embodiment depicted in FIG. 5, two water recyclers 110 are coupled to the mixing tank 130, one coupled to a first fluid inlet of the mixing tank 130 and the other coupled to the second fluid inlet of the mixing tank 130. The first fluid inlet of the mixing tank 130 is coupled to the cathode fluid outlet of the fuel cell main body 140a through one of the water recyclers 110. The second fluid outlet of the mixing tank 130 is coupled to the anode fluid outlet of the fuel cell main body 140a through the other water recycler 110. The water and non-reaction fuel recycled in the fluid recycling apparatus 10d are mixed with raw fuel supplied from the fuel supplying apparatus 150a and supplied to the fuel cell main body 140a.

Both water recyclers 110 selectively recycle the liquid of the gas and liquid from the cathode of the fuel cell main body 140. The liquid in the cathode effluents is water, and the liquid in the anode effluents is non-reaction fuel.

The mixing tank 130 stores the non-reaction fuel and water recycled by the two water recyclers 110 and stores the raw fuel supplied from the fuel supplying apparatus 150a. The mixed liquid fuel of raw fuel, non-reaction fuel, and water is supplied to the fuel cell main body 140a through the transfer device 132. The mixing tank 130 includes a vent hole for discharging the undesired gases to the outside of the first fluid inlet and the second fluid outlet as described above. The mixing tank 130 also includes a fluid outlet for supplying the liquid fuel to the fuel cell main body 140a. The transfer device 132 can be any apparatus capable of transferring liquid, for example, a fuel pump.

The fuel supplying apparatus 150a stores hydrogen-containing fuel as raw fuel and supplies the stored hydrogen-containing fuel to the mixing tank 130. Nonlimiting examples of hydrogen-containing fuels include hydro-carbonaceous fuels such as methanol (MeOH), ethanol, etc. The fuel supplying apparatus 150a can be a fuel tank storing the hydrogen-containing fuel and a transfer device, such as a fuel pump, between the fuel tank and the mixing tank 130. Also, the fuel supplying apparatus 150a can be a compression tank having constant pressure.

The fuel cell main body 140a generates electric energy by electrochemically reacting liquid fuel supplied from the mixing tank 130 and oxygen contained in the air. The fuel cell main body discharges anode effluents (such as unreacted fuel and carbon dioxide as by-products, etc.) and cathode effluents (such as water, etc.). The fuel cell main body 140a can be a direct methanol fuel cell.

In a direct methanol fuel cell system, when the channel of the cathode and/or the anode separators of the fuel cell main body 140a has a serpentine shape, the internal pressure of the cathode fluid outlet is lower than that of the cathode fluid inlet so that a congestion phenomenon can occur in the flow of the liquid fuel and by-products. However, the direct methanol fuel cell system according to an embodiment of the present invention includes a water recycler 100 that discharges water from the cathode by pressure-electroosmosis. Also, another water recycler 110 coupled to the anode fluid outlet discharges the non-reaction fuel from the anode by pressure so that fluid flows smoothly within the anode.

The fuel cell system using the fuel recycling apparatus according to embodiments of the present invention operate irrespective of shaking or rotation of the system. The systems of the present invention can selectively move the liquid from the fuel cell main body by means of electroosmosis, and can discharge the gas to the outside. Accordingly, the fuel cell system using the fluid recycling apparatus according to embodiments of the present invention can recycle or discard by effectively recycling the water and/or non-reaction fuel discharged from the cathode and/or anode of the fuel cell main body. Fluids that might be discarded include polluted water generated from the cathode by means of carbon dioxide, fuel aqueous solutions, or fuel crossover from the movement from the anode to the cathode within the fuel cell main body through the electrolyte membrane.

Figure 6:
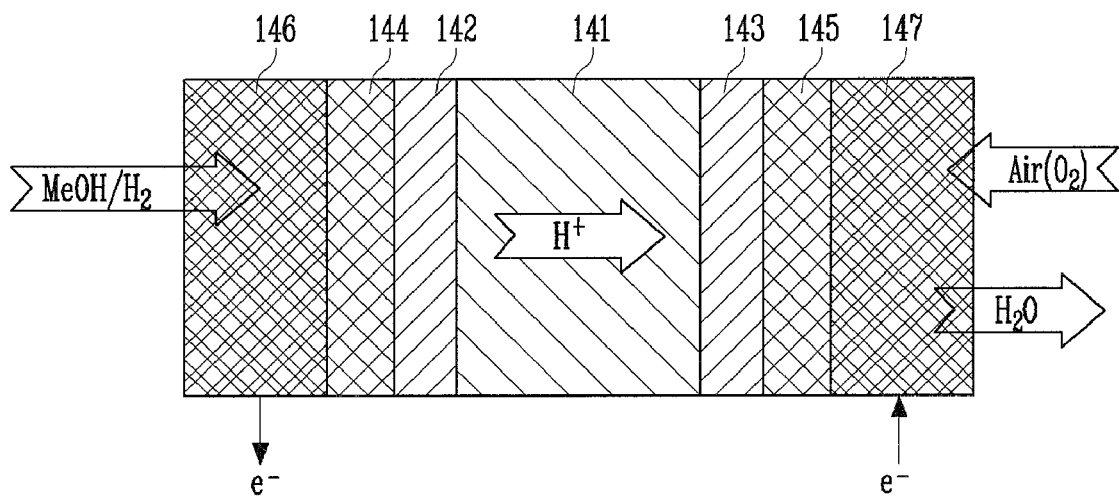
FIG. 6 is a schematic depicting the operation of a fuel cell system according to one embodiment of the present invention.

FIG. 6 is a schematic depicting the operation of a fuel cell main body in a fuel cell system according to an embodiment of the present invention. Referring to FIG. 6, the fuel cell main body can be a polymer electrolyte membrane fuel cell using pure hydrogen or hydrogen rich reformed gas as fuel, or a direct methanol fuel cell using methanol or other liquid fuels. The fuel cell main body includes an anode electrode, a cathode electrode, and an electrolyte membrane 141 positioned between the anode electrode and the cathode electrode.

The anode electrode includes a catalyst layer 142, a microporous layer 144, and a gas diffusion layer 146. The cathode electrode includes a catalyst layer 143, a microporous layer 145, and a gas diffusion layer 147.

Nonlimiting examples of suitable proton conductive polymers for use as the electrolyte membrane 141 include fluoro-based polymers, ketonic polymers, benzimidazole-based polymers, ester-based polymers, amide-based polymers, imide-based polymers, sulfonic polymers, styrene-based polymers, hydro-carbonaceous polymers, etc.

A solvent may be used to manufacture the electrolyte membrane 141. Nonlimiting examples of suitable solvents include ethanol, isopropylalcohol, n-propylalchol, butylalcohol, water, dimethylsulfoxide (DMSO), dimethylacetamide (DMAc), N-methylpyrrolidone (NMP), and mixtures thereof. In one embodiment, a mixture of at least two solvents is used.

The catalyst layers 142, 143 of the anode electrode and the cathode electrode promote the rapid chemical reaction of supplied fuel or oxidant. In one embodiment, the catalyst layers 142, 143 include a metal catalyst selected from platinum, ruthenium, osmium, alloys of platinum-ruthenium, alloys of platinum-osmium, alloys of platinum-palladium, and alloys of platinum-M (where M is a transition metal selected from Ga, Ti, V, Cr, Mn, Fe, Co, Ni, Cu, Zn and combinations thereof), and combinations thereof. Alternatively, the catalyst may be impregnated in a carrier and include a metal catalyst selected from platinum, ruthenium, osmium, alloys of platinum-ruthenium, alloys of platinum-osmium, alloys of platinum-palladium, alloys of platinum-M (where M is a transition metal selected from Ga, Ti, V, Cr, Mn, Fe, Co, Ni, Cu, Zn, and combinations thereof), and combinations thereof. Any material with conductivity can be used as the carrier. In one exemplary embodiment, the carrier is a carbon carrier.

The microporous layers 144, 145 of the anode electrode and the cathode electrode function to uniformly distribute and supply fuel or oxidant to each catalyst layer 142, 143. In particular, the microporous layer of the cathode 145 functions to smoothly exhaust water generated from the catalyst layer of the cathode 143. The microporous layers 144, 145 described above can be carbon layers coated on backing layers 146, 147. Also, the microporous layers 144, 145 may include a carbon material selected from graphite, carbon nanotubes (CNT), fullerene (C60), activated carbon, vulcan, ketjen black, carbon black, carbon nanohorns, and combinations thereof. The microporous layers 144, 145 may further include a binder selected from poly(perfluorosulfonic acid), poly(tetrafluoroethylene), fluorinated ethylene-propylene, and combinations thereof.

The backing layers 146, 147 of the anode electrode and the cathode electrode function to back each catalyst layer 142, 143, and at the same time, to distribute fuel, water, air, etc., to collect generated electricity, and to prevent loss of materials in each catalyst layer 142, 143. The backing layers 146, 147 described above can be carbon based materials, such as carbon cloth, carbon paper, etc.

The operating principle of the aforementioned fuel cell main body will now be described. Hydrogen-containing fuel is supplied from the fuel supplying apparatus to the fuel cell main body. Oxidant, for example, oxygen in the air, is supplied to the cathode. The hydrogen-containing fuel is ionized and oxidized to protons ($H^+$) and electrons ($e^-$) by means of the electrochemical reaction at the anode electrode. The generated protons move to the cathode electrode through the electrolyte membrane 141, and the electrons move from the anode electrode to the cathode electrode through the external circuit. Heat and water are generated by the electro-chemical reduction reaction of the proton arriving at the cathode electrode and the oxidant supplied to the cathode electrode. The electrons necessary for the reduction reaction generate electric energy by moving from the anode electrode to the cathode electrode.

When methanol is used as the hydrogen-containing fuel, the electro-chemical reaction of the fuel cell main body can be represented by the following Reaction Scheme 1.

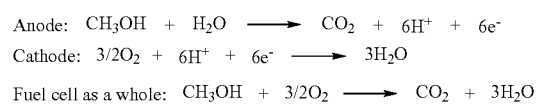

When pure hydrogen or a hydrogen rich reformed gas is used as the hydrogen-containing fuel, the electro-chemical reaction of the fuel cell main body can be represented by the following Reaction Scheme 2.

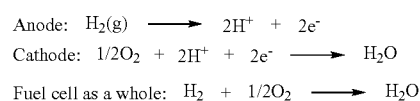

As described above, according to embodiments of the present invention, only the liquid among the gases and liquids injected from the outside are selectively recycled. Also, embodiments of the present invention provide a fluid recycling apparatus having a simple structure capable of electroosmotically transferring the recycled liquid. Therefore, irrespective of changes in the operating state (such as shaking, rotation, turn over, etc.) of an apparatus including the fluid recycling apparatus (for example, a portable fuel cell system), the structure of the fluid recycling apparatus remains capable of stably operating the system. A fuel cell system with the fluid recycling apparatus is provided, thereby making a small fuel cell system.

Although exemplary embodiments of the present invention have been illustrated and described, those of ordinary skill in the art will appreciate that certain modifications and changes to the described embodiments may be made without departing from the principle, spirit and scope of the present invention as defined in the claims.

What is claimed is:

1. A fluid recycling apparatus comprising:
   a porous member having first and second ends;
   a first electrode coupled to the first end of the porous member;
   a second electrode coupled to the second end of the porous member; and
   a power supplier for applying a voltage between the first electrode and the second electrode,
   wherein the porous member is adapted to move a liquid from the first end of the porous member to the second end of the porous member and to discharge a gas through a middle portion of the porous member in response to the voltage applied by the power supplier, and
   wherein the middle portion of the porous member has apertures configured for penetration by the gas prior to being discharged.

2. The fluid recycling apparatus as claimed in claim 1, further comprising:
   a gas-liquid separator between the first end of the porous member and the second end of the porous member, wherein when the gas and liquid are injected near the first end of the porous member, the liquid is discharged through the second end of the porous member, and the gas is discharged through the gas-liquid separator.

3. The fluid recycling apparatus as claimed in claim 1, wherein the porous member is generally bar-shaped.

4. The fluid recycling apparatus as claimed in claim 1, wherein the porous member has a generally flexed shape having at least one bend.

5. The fluid recycling apparatus as claimed in claim 1, wherein the porous member has a generally serpentine shape.

6. The fluid recycling apparatus as claimed in claim 1, wherein the porous member comprises a material selected from the group consisting of polymers, silica, silicon, quartz, ceramics, and mixtures thereof.

7. The fluid recycling apparatus as claimed in claim 1, further comprising a heat exchanger coupled to the first end and the second end of the porous member, wherein the heat exchanger is adapted to remove heat energy from the gas and the liquid.

8. The fluid recycling apparatus as claimed in claim 1, further comprising a mixing tank coupled to the second end of the porous member, wherein the mixing tank is adapted to store water from the second end of porous member.

9. The fluid recycling apparatus as claimed in claim 1, wherein the porous member comprises a first groove at the first end of the porous member and a second groove at the second end of the porous member, wherein a first pipe is coupled to the first groove and the second pipe is coupled to the second groove.

10. A fuel cell system comprising:
    a fuel cell main body comprising an anode, a cathode, and an electrolyte between the anode and the cathode; and
    a fluid recycling apparatus for selectively recycling a fluid from the fuel cell main body, the fluid recycling apparatus comprising:
       a porous member having first and second ends;
       a first electrode coupled to the first end of the porous member;
       a second electrode coupled to the second end of the porous member; and
       a power supplier for applying a voltage between the first and second electrodes,
    wherein the porous member is adapted to move a liquid from the first end of the porous member to the second end of the porous member and to discharge a gas through a middle portion of the porous member in response to the voltage applied by the power supplier,
    wherein the middle portion of the porous member has apertures configured to be penetrated by the gas prior to being discharged.

11. The fuel cell system as claimed in claim 10, further comprising:
    a first pipe coupled to a fluid outlet of the cathode and anode and a groove at the first end of the porous member; and
    a second pipe coupled to a fluid outlet of the cathode and anode and a groove at the second end of the porous member.

12. The fuel cell system as claimed in claim 11, further comprising a first fixing device for fixing the first pipe to the first end of the porous member, and a second fixing device for fixing the second pipe to the second end of the porous member.

13. The fuel cell system as claimed in claim 10, further comprising a gas-liquid separator between the first and second ends of the porous member, wherein the gas is discharged through the gas-liquid separator.

14. The fuel cell system as claimed in claim 13, wherein the gas-liquid separator surrounds the porous member.

15. The fuel cell system as claimed in claim 10, further comprising a heat exchanger for cooling the gas and liquid.

16. The fuel cell system as claimed in claim 10, further comprising a mixing tank for storing the liquid from the fluid recycling apparatus, wherein the mixing tank is coupled to the fluid recycling apparatus.

17. The fuel cell system as claimed in claim 10, wherein the porous member has a generally bar shape.

18. The fuel cell system as claimed in claim 10, wherein the porous member has a generally flexed shape having at least one bend.

19. The fuel cell system as claimed in claim 10, wherein the porous member has a generally serpentine shape.

20. The fuel cell system as claimed in claim 10, wherein the porous member comprises a material selected from the group consisting of polymers, silica, silicon, quartz, ceramics, and mixtures thereof.

21. The fuel cell system as claimed in claim 10, wherein the voltage is determined according to a distance between the first electrode and the second electrode.

22. The fuel cell system as claimed in claim 10, further comprising an oxidant supplying apparatus for supplying oxidant to the cathode, and a fuel supplying apparatus for supplying fuel to the anode.

23. The fuel cell system as claimed in claim 10, wherein the fuel cell main body comprises a polymer electrolyte membrane fuel cell or a direct methanol fuel cell.

* * * * *

UNITED STATES PATENT AND TRADEMARK OFFICE
CERTIFICATE OF CORRECTION

| | | |
|---|---|---|
| PATENT NO. | : 7,758,990 B2 | |
| APPLICATION NO. | : 12/170259 | |
| DATED | : July 20, 2010 | |
| INVENTOR(S) | : Myeong-Ju Ha et al. | |

It is certified that error appears in the above-identified patent and that said Letters Patent is hereby corrected as shown below:

On the Title Page

Item (57) Abstract, line 9         After "of"
                                   Insert -- the --

Column 11, Claim 8,                After "of"
line 54                            Insert -- the --

Signed and Sealed this

Eleventh Day of October, 2011

David J. Kappos
*Director of the United States Patent and Trademark Office*